United States Patent [19]

Reeve

[11] 4,299,653
[45] Nov. 10, 1981

[54] METHOD OF BLEACHING PULP WITH AN AQUEOUS SOLUTION OF CHLORINE DIOXIDE AND CHLORINE FOLLOWED BY A CHLORINE SOLUTION

[75] Inventor: Douglas W. Reeve, Orton, Canada

[73] Assignee: ERCO Industries Limited, Islington, Canada

[21] Appl. No.: 98,524

[22] Filed: Nov. 29, 1979

Related U.S. Application Data

[63] Continuation-in-part of Ser. No. 30,557, Apr. 16, 1979, abandoned.

[51] Int. Cl.³ .................. C01B 11/02; D21C 9/14
[52] U.S. Cl. ............................ 162/88; 423/478; 423/506; 423/552
[58] Field of Search .............. 423/478, 541, 504, 506, 423/551, 552; 162/88, 89, 29, 30, 60, 67; 8/108 A, 108 R

[56] References Cited

U.S. PATENT DOCUMENTS

| | | | |
|---|---|---|---|
| Re. 28,884 | 6/1976 | Jack et al. | 162/66 |
| 2,166,330 | 7/1939 | Vincent | 162/67 |
| 3,433,702 | 3/1969 | Jack et al. | 162/66 |
| 3,536,577 | 10/1970 | Rapson et al. | 162/67 |
| 3,864,456 | 2/1975 | Winfield et al. | 423/478 |
| 4,086,329 | 4/1978 | Cowley et al. | 423/478 |

*Primary Examiner*—S. Leon Bashore
*Assistant Examiner*—Steve Alvo
*Attorney, Agent, or Firm*—Sim & McBurney

[57] ABSTRACT

The advantages of the serial application of chlorine dioxide and chlorine without intermediate wash during the bleaching of wood pulp in the absence of significant amounts of dissolved organic materials are improved by the presence of small quantities of dissolved chlorine in the chlorine dioxide solution.

8 Claims, 3 Drawing Figures

METHOD OF BLEACHING PULP WITH AN AQUEOUS SOLUTION OF CHLORINE DIOXIDE AND CHLORINE FOLLOWED BY A CHLORINE SOLUTION

REFERENCE TO RELATED APPLICATION

This application is a continuation-in-part of copending U.S. patent application Ser. No. 030,557 filed Apr. 16, 1979 now abandoned.

FIELD OF INVENTION

The present invention relates to an improved bleaching sequence.

BACKGROUND TO THE INVENTION

It has previously been suggested in U.S. Pat. No. 3,536,577 to effect bleaching of cellulosic fibrous material, particularly wood pulp, using an aqueous solution of chlorine dioxide and chlorine at moderate temperatures up to 35° C. In this process, the chlorine dioxide constitutes about 20 to about 95% of the total available chlorine of the solution.

It has also previously been found that the characteristics of the pulp bleached by the latter process can be improved by applying the chlorine dioxide and chlorine sequentially instead of as a mixture of the two, without an intermediate washing between the two bleaching chemical applications, as described in U.S. Pat. Nos. 3,433,702 and 3,501,374.

SUMMARY OF INVENTION

It has now been surprisingly found that the efficiency of delignification of the bleached pulp is further improved if part of the chlorine is included with the chlorine dioxide in the first step of the bleaching chemical application.

In accordance with the present invention, there is provided a multi-step process, wherein a gaseous mixture of chlorine dioxide, chlorine and steam is formed using a specific procedure, an aqueous solution of chlorine dioxide and chlorine having a specific concentration range is formed from the gaseous mixture, and a cellulosic fibrous material pulp is bleached in an aqueous suspension thereof at a specific consistency using the aqueous solution, in a serial application with an aqueous chlorine solution without an intermediate washing step under specific conditions.

To distinguish the bleaching chemical application procedure of the present invention from that previously described, the application of an aqueous solution of chlorine dioxide and chlorine, followed, without an intermediate wash, by chlorine is termed "serial bleaching" and the previous process wherein chlorine dioxide is followed by chlorine without an intermediate wash is termed "sequential bleaching".

DESCRIPTION OF PREFERRED EMBODIMENT OF INVENTION

Figure 3:
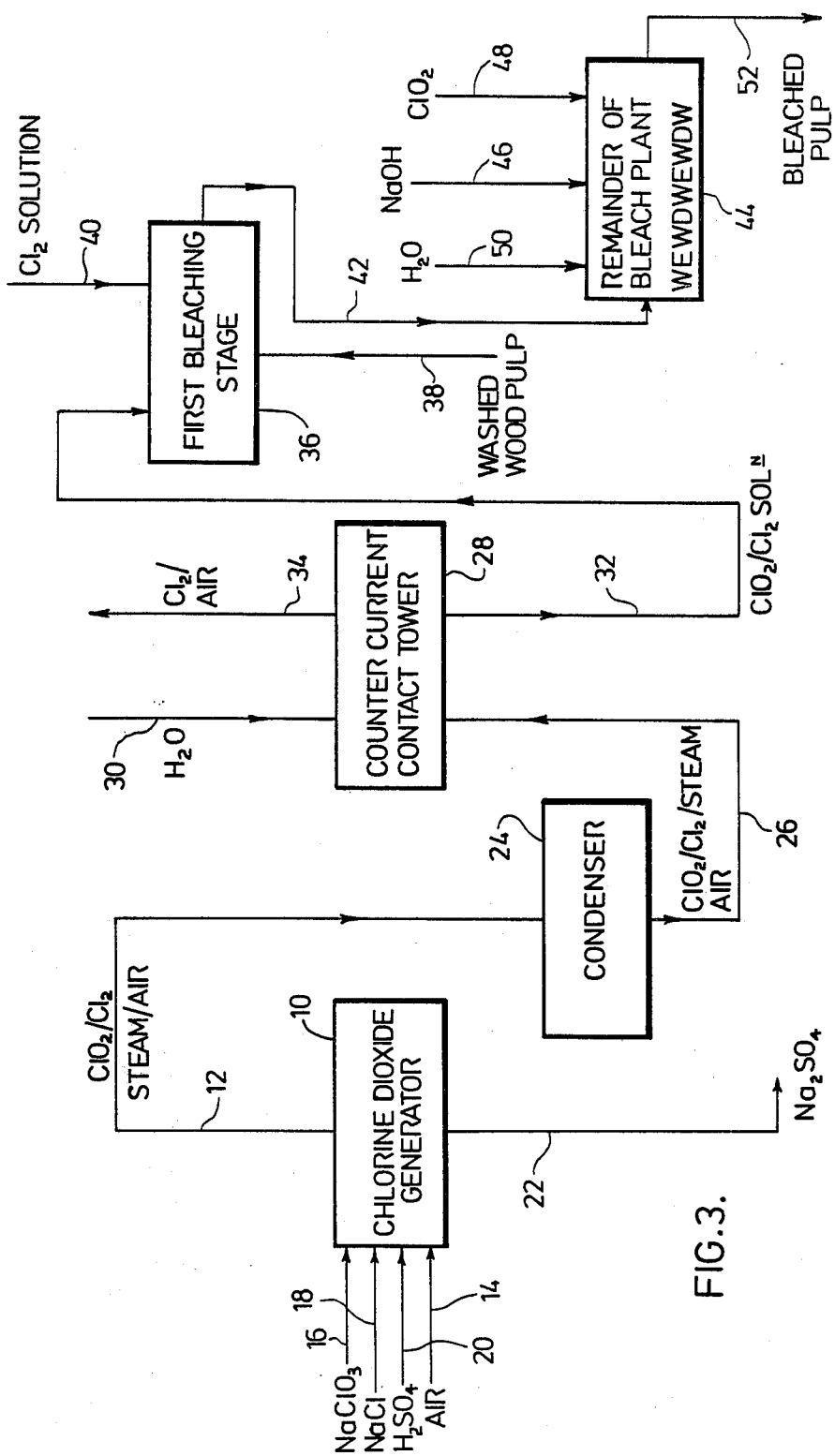
FIG. 3 is a flow sheet illustrating one embodiment of the invention.

Referring to FIG. 3 which is a flow sheet of the current best mode of effecting the invention known to the applicants, a chlorine dioxide generator 10 produces a gaseous product stream 12 containing chlorine dioxide, chlorine and steam.

The chlorine dioxide generator 10 has a unilocular reaction zone containing an aqueous acid reaction medium which is maintained at a temperature of about 55° to about 85° C. while a subatmospheric pressure of about 80 to about 300 mm Hg is applied to the reaction zone to maintain the same at its boiling point. An air bleed in line 14 is provided.

Reactants are continuously fed to the reaction medium in the form of sodium chlorate in line 16, sodium chloride in line 18 and sulphuric acid is fed by line 20. Hydrochloric acid may be used to replace all or part of the sodium chloride, in which case the hydrochloric acid also replaces part of the sulphuric acid. The feed of sulphuric acid maintains the total acid normality of the reaction medium in the range of about 2 to about 4.8 normal. Once saturation of the reaction medium is reached after start up, anhydrous neutral sodium sulphate precipitates from the reaction medium and is removed by line 22.

The reactions which occur in the chlorine dioxide generator 10 may be represented by the equations:

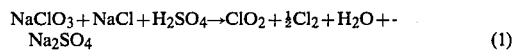

$$NaClO_3 + NaCl + H_2SO_4 \rightarrow ClO_2 + \tfrac{1}{2}Cl_2 + H_2O + Na_2SO_4 \tag{1}$$

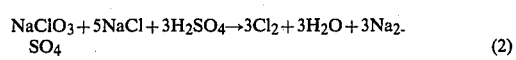

$$NaClO_3 + 5NaCl + 3H_2SO_4 \rightarrow 3Cl_2 + 3H_2O + 3Na_2SO_4 \tag{2}$$

The reaction of equation (1) predominates in the process and the extent to which that reaction predominates constitutes the efficiency of the chlorine dioxide producing process.

The production of chlorine dioxide by the latter procedure has considerable benefits over prior chlorine dioxide-producing producing processes and these have lead to wide commercial practice of the process throughout the world. The process is known as the ERCO R3 (trademarks) process and is the subject of the U.S. Pat. No. 3,864,456, assigned to the assignee of this application.

Although the invention is described with particular reference to the R3 process, the invention is applicable to and effective with other chlorine dioxide and chlorine producing processes wherein added chloride ion is used as the reducing agent for chlorate in the aqueous acid reaction medium while the reaction medium is maintained at its boiling point under a subatmospheric pressure, whereby the chlorine dioxide and chlorine is admixed with steam as the diluent gas therefor.

Examples of other chlorine dioxide and chlorine producing processes which may be used in place of the procedure of U.S. Pat. No. 3,864,456 are the ERCO R5 (trademarks) process, described in Canadian Pat. No. 913,328 and U.S. Pat. No. 4,075,308, and the ERCO R6 (trademarks) process, described in U.S. Pat. No. 3,929,974, wherein the sodium chlorate is reduced by hydrochloric acid, which provides all the chloride ions and all the hydrogen ions required for the process. The reactions involved are summarized by the following equations:

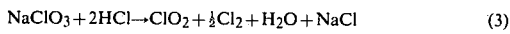

$$NaClO_3 + 2HCl \rightarrow ClO_2 + \tfrac{1}{2}Cl_2 + H_2O + NaCl \quad (3)$$

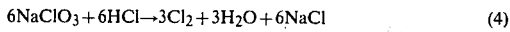

$$6NaClO_3 + 6HCl \rightarrow 3Cl_2 + 3H_2O + 6NaCl \quad (4)$$

wherein equations (3) and (4) correspond to equations (1) and (2) for the $R_3$ process.

Another chlorine dioxide and chlorine producing process which may be utilized in the present invention is the ERCO R7 (trademarks) process, described in U.S. Pat. No. 4,086,329, wherein sulphuric acid and hydrochloric acid used in the reduction reaction are mainly regenerated internally by reaction of chlorine with sulphur dioxide and water.

The gaseous product stream in line 12 consisting of chlorine dioxide, chlorine, steam and a small amount of air is conveyed to a condensor 24 wherein the gas stream is cooled to a temperature of about 15° to about 55° C. (about 60° to about 130° F.) to cause partial condensation of the steam therein.

The gas stream in line 26 is fed into countercurrent contact in a contact tower 28 with a stream of chilled water in line 30 having a temperature of about 3° to about 10° C. (about 40° to about 50° F.) to dissolve all the chlorine dioxide from the gaseous stream along with part of the chlorine.

The aqueous solution of chlorine dioxide and chlorine leaving the tower 28 in line 32 usually has a concentration of chlorine dioxide of about 8 to about 9 grams per liter and a concentration of chlorine of about 1.5 to about 1.8 grams per liter, the actual concentrations being dependent on the temperature of the chilled water in line 30 and the flow rate of water to the tower 28. At the same flow rate, the concentrations of chlorine dioxide and chlorine increase with decreasing temperature, so that colder rather than warmer temperatures often are preferred.

The concentration of chlorine present in the aqueous solution of chlorine dioxide and chlorine in line 32 is always above 6.0% and up to 10.0% of the total available chlorine of that solution, preferably about 7 to 8%.

The term "total available chlorine" is used herein in its normal meaning in the bleaching art and refers to the total bleaching power of the solution, chlorine dioxide having a bleaching power which is 2.63 times that of chlorine on a weight basis.

Solutions of such concentrations contrast markedly with chlorine dioxide solutions obtained from other chlorine dioxide-producing processes. In those cases where no chloride ion is added and substantially pure chlorine dioxide is formed, the aqueous solution contains a negligible chlorine concentration. For those processes where chloride ion is added as the reducing agent and chlorine is produced along with the chlorine dioxide, such as, in the ERCO R2 (trademarks) process, which is the subject of U.S. Pat. No. 2,863,722, wherein air is used to dilute the gases, the chlorine dioxide solution produced by absorption in water contains some dissolved chlorine, but the concentration is well below the concentration thereof in the chlorine dioxide and chlorine solution present in line 32. Under typical operating conditions, the differences in partial pressure of the gases in the processes result in an aqueous solution of chlorine dioxide and chlorine containing 8 grams per liter chlorine dioxide and 1.7 grams per liter chlorine in the case of the R3 or similar process and an aqueous solution of chlorine dioxide and chlorine containing 8 grams per liter chlorine dioxide and 0.5 grams per liter chlorine in the case of the R2 process.

The reference to chlorine dioxide solutions used in the prior sequential bleaching process containing small quantities of chlorine is to such solutions. Such prior "technical chlorine dioxide solutions" may contain up to about 10% by weight of chlorine, corresponding to 4% on an available chlorine basis, although the applicants are aware that the literature refers to values as high as 5.7% on an available chlorine basis. The typical R2 process solution contains about 2.3% on an available chlorine basis.

The difference in chlorine concentrations between those provided by prior procedures and those resulting in this invention arises from the differences in partial pressure of chlorine dioxide and chlorine in the gaseous streams which are contacted by water in the absorption tower.

The gaseous product stream resulting from the contact tower 28 consists of chlorine and air in line 34. The vacuum in the generator 10 is usually applied via the gaseous stream in line 34, typically after dissolving the chlorine therefrom in a convenient aqueous medium. A vacuum pump of any desired type may be used to apply the vacuum, and the value of the subatmospheric pressure is controlled by the air bleed to the generator 10 in line 14.

Usually the chlorine dioxide generator 10 is provided with sufficient capacity that the chlorine dioxide and chlorine solution in line 32 is of sufficient volume for use in all bleaching operations requiring the use of chlorine dioxide. For convenience of illustration, the chlorine dioxide solution in line 32 is shown as being passed to the first stage 36 of a multistage bleaching and purification operation effected on a washed but otherwise untreated wood pulp in line 38, although it will be understood that usually only a proportion thereof passes to the first stage of the bleach plant.

The process of the present invention is applicable to any cellulosic fibrous material but is described with particular reference to the bleaching of wood pulp, preferably wood pulp produced by the Kraft process, i.e., wood pulp produced by digestion of wood chips in a pulping liquor containing sodium hydroxide and sodium sulphide as the active pulping chemicals.

The term "bleaching stage" as used herein refers to a pulp bleaching operation effected between other pulp treatments, usually washings. The term "bleaching step" as used herein refers to a pulp bleaching treatment effected within a bleaching stage.

In the first bleaching stage 36, the pulp suspension, of consistency of about 2 to about 16% by weight of pulp is bleached by a serial application of the bleaching solutions.

In conventional pulp mill operations, pulp is washed to free the same as completely as possible from spent pulping liquor so as to minimize the extent to which dissolved impurities consume bleaching chemicals. Some black liquor "carry-over" may occur, leading to the presence of dissolved organic material in the pulp suspension. The term "dissolved organic material" as used herein refers to bleaching chemical-consuming organic material dissolved in the aqueous phase of the pulp suspension and is measured in terms of total organic carbon (TOC).

The concentration of dissolved organic material from the source may range up to about 2% by weight TOC on pulp, although the concentration usually does not exceed about 1%, by weight TOC on pulp. The present invention is concerned with the bleaching of pulp in a pulp suspension which may contain such quantities of dissolved organic material.

The pulp suspension is subjected to a first bleaching step with the chlorine dioxide and chlorine solution fed by line 32 at a temperature of about 35° to about 70° C., preferably about 50° to about 65° C. The first bleaching step may be effected at any desired acid pH value, usually at a pulp suspension pH of about 1 to about 6.

After a period of time of from about 5 seconds to about 10 minutes, usually about 30 seconds to about 5 minutes, has lapsed from the application of the aqueous solution of chlorine dioxide and chlorine, an aqueous chlorine solution fed by line 40 is applied to the pulp suspension. The chlorine solution in line 40 may be provided from any convenient source, for example, by absorbing the chlorine gas in line 34 in water. The chlorine treatment may be effected at any desired acid pH value, usually at a pulp suspension pH of about 0.7 to about 3. The bleaching procedure is allowed to proceed for about 10 to about 60 minutes at the bleaching temperature of about 35° to about 70° C.

The overall amount of available chlorine applied to the pulp in the first and second bleaching steps, both as chlorine dioxide and chlorine, usually is about 2 to about 10% by weight of the pulp. The chlorine dioxide in the aqueous solution of chlorine dioxide and clorine constitutes about 20 to about 90%, preferably about 30 to about 75%, of the total available chlorine used in the first and second bleaching steps.

Following completion of the bleaching stage, the pulp passes by line 42 to the remainder of the multistage bleaching and caustic extraction operations 44, wherein the pulp is subjected to EDED steps using an aqueous solution of sodium hydroxide fed by line 46 in the E-stages, and an aqueous solution of chlorine dioxide fed by line 48 in the D-stages, usually part of the chlorine dioxide and chlorine solution in line 32. Intermediate washing is usually effected between each chemical application stage, using water fed by line 50. Other bleaching agents, such as, hypochlorite and peroxide may be used in the bleaching steps. The final bleached pulp is removed by line 52.

The bleaching and purification operations effected in 36 and 44 may be carried out by the so-called "dynamic bleaching" process, as described in Canadian Pat. No. 783,483, in which case the washing steps usually are omitted.

EXAMPLES

Example 1

A wood pulp of 34.2 Kappa number, a K number of 23.4 and a viscosity of 28.8 cps was bleached in a series of experiments using 7.6% equivalent chlorine on pulp for 30 minutes at 3.5% consistency and 60° C., washed, caustic extracted using 3.0% NaOH on pulp for 2 hours at 12% consistency and 70° C., and again washed. In each case, the Kappa number was determined following the treatments. Chlorine dioxide and chlorine were used in the bleaching step in the proportions of 70% of the total available chlorine being provided by chlorine dioxide and 30% of the total available chlorine being provided by chlorine.

The series of experiments included tests conducted in the absence of dissolved organic carbon and tests conducted in the presence of dissolved organic carbon at various levels of % TOC on pulp. The series of experiments also included tests using an aqueous solution containing all the chlorine dioxide followed one minute after the application thereof by the serial application of all the chlorine in the bleaching step without an intermediate wash, and tests using an initial application of an aqueous solution of chlorine dioxide and chlorine containing all the chlorine dioxide and part of the chlorine, in varying proportions, followed one minute after the application thereof by the remainder of the chlorine without an intermediate wash.

Figure 1:
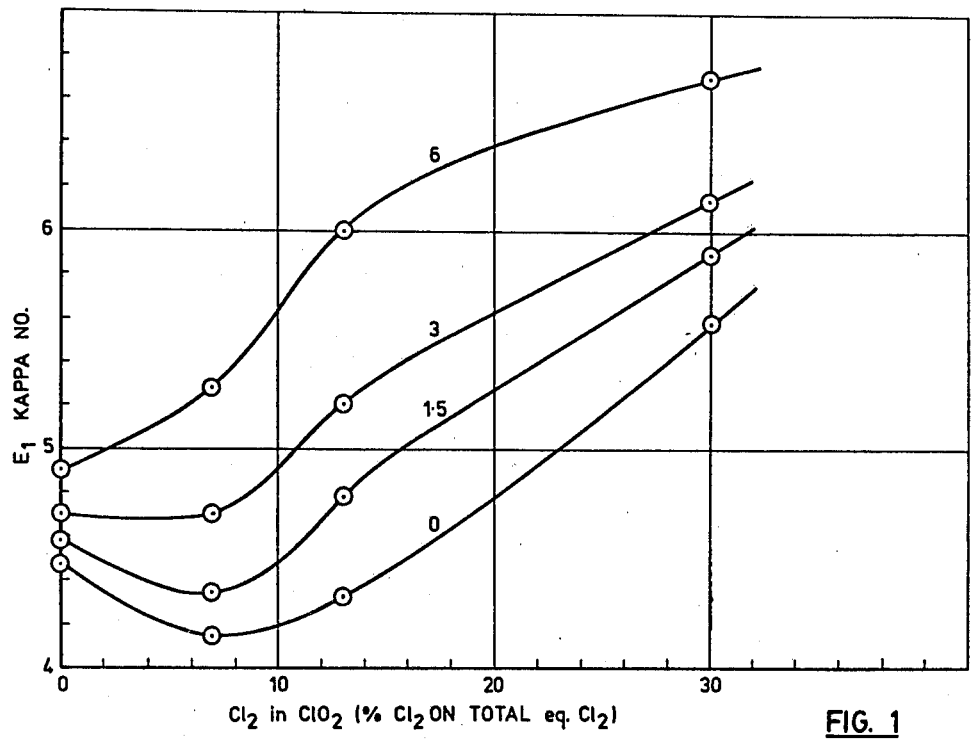
FIG. 1 is a graphical representation of the variation in pulp $E_1$ Kappa values with chlorine content of an aqueous solution of chlorine dioxide and chlorine used in serial bleaching chemical application at differing dissolved organic material levels.

The results of the series of experiments were plotted graphically on the basis of $E_1$ Kappa number against proportion of $Cl_2$ in $ClO_2$ solution for varying % TOC levels and the graph appears as FIG. 1. As may be seen from the results depicted in FIG. 1, the efficiency of delignification of the pulp, as depicted by the Kappa number, improves when the serial application of the bleaching chemicals is effected using an initial aqueous solution of chlorine dioxide and part of the chlorine, when compared with the initial application of an aqueous solution of chlorine dioxide and chlorine, over a limited range of chlorine content of the aqueous solution of chlorine dioxide and chlorine and % TOC level on pulp.

The improved efficiency is best at 0% TOC and is substantially absent at 3% TOC. The improved efficiency is obtained in the range of 6 to 10% of the total available chlorine provided by $Cl_2$ in the aqueous solution of chlorine dioxide and chlorine.

Example 2

Figure 2:
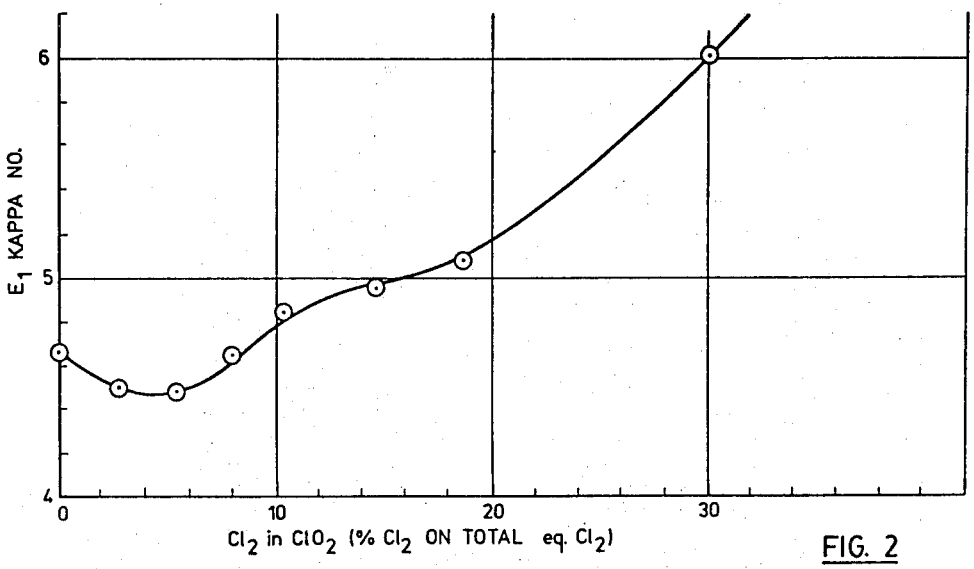
FIG. 2 is a graphical representation of a similar variation to FIG. 1 for a different equivalent $Cl_2$ level in the bleaching step.

The procedure of Example 1 was repeated except that in this instance, a series of experiments was conducted at 0% TOC only at an equivalent chlorine level of 6.2% on pulp. The $E_1$ Kappa results attained were plotted graphically and appear as FIG. 2. The results of FIG. 2 confirm the beneficial results illustrated by FIG. 1.

SUMMARY OF DISCLOSURE

In summary of this disclosure, the present invention provides a method of serial application of bleaching chemicals in the absence of significant amounts of dissolved organic materials wherein improved delignification efficiency may be attained by the presence of small dissolved quantities of chlorine in the chlorine dioxide solution. Modifications are possible within the scope of this invention.

What we claim is:

1. A method of bleaching pulp using chlorine dioxide, which comprises:
   (a) continuously forming a gaseous mixture of chlorine dioxide, chlorine and steam by:
      (i) continuously feeding a sodium chlorate solution to an aqueous acid reaction medium present in a unilocular reaction zone,
      (ii) continuously feeding sulphuric acid to said aqueous reaction medium in an amount to maintain the total acid normality of the reaction medium in the range of about 2 to about 4.8 normal,
      (iii) continuously feeding sodium chloride, hydrochloric acid or a mixture of sodium chloride and hydrochloric acid to said aqueous reaction medium,
      (iv) continuously maintaining said reaction medium at a temperature of about 55° to about 85° C.

while maintaining said reaction zone under a subatmospheric pressure of about 80 to about 300 mm Hg to cause the formation of chlorine dioxide and chlorine and the evaporation of water from the reaction medium, (v) continuously depositing anhydrous neutral sodium sulphate from the reaction medium in said reaction medium in said reaction zone once the reaction medium becomes saturated thereby after start up, and (vi) continuously removing the gaseous mixture of chlorine dioxide, chlorine and steam from the reaction zone;

(b) continuously cooling said gaseous stream to a temperature of about 15° to about 55° C. to cause condensation of at least a substantial proportion of the steam therefrom to provide a chlorine dioxide- and chlorine-containing gas stream;

(c) continuously contacting the latter gas stream with water having a temperature of about 3° to about 10° C. at a flow rate sufficient to form an aqueous solution of chlorine dioxide and chlorine containing about 8 to about 9 grams per liter of chlorine dioxide and about 1.5 to about 1.8 grams per liter of chlorine, and a gaseous chlorine stream; and (d) bleaching a cellulosic fibrous material pulp for about 10 to about 60 minutes at a temperature of about 35° to about 70° C. in aqueous suspension having a consistency of about 2 to about 16% by weight of pulp and containing no more dissolved organic material than about 2% by weight TOC on pulp at an overall equivalent chlorine concentration of about 2 to about 10% by weight of the pulp, by:

(i) subjecting said suspension to a first bleaching step at an acid pH value using at least part of said aqueous solution of chlorine dioxide and chlorine formed in step (c), and (ii) without an intermediate washing step, subjecting the suspension to a second bleaching step at an acid pH using a chlorine solution and commencing about 5 seconds to about 10 minutes after commencement of said first bleaching step, the chlorine dioxide in said aqueous solution of chlorine dioxide and chlorine constituting about 20 to about 90% of the total available chlorine used in said first and second bleaching steps.

2. The method of claim 1 wherein said dissolved organic material content of said suspension is up to about 1.0% by weight TOC on pulp.

3. The method of claim 1 wherein said cellulosic fibrous material is wood.

4. The method of claim 1 wherein said first and second bleaching steps are effected at a temperature of about 50° to about 65° C. and the second bleaching step is commenced about 30 seconds to about 5 minutes after commencement of the first bleaching step.

5. The method of claim 1 wherein said chlorine dioxide in said aqueous solution of chlorine dioxide and chlorine constitutes about 50 to about 75% of the total available chlorine used in said first and second bleaching steps.

6. The method of claim 1 wherein said pulp suspension has a pH of about 1 to about 6 in said first bleaching step and a pH of about 0.7 to about 3 in said second bleaching step.

7. The method of claim 1 wherein:
(a) said cellulosic fibrous material is wood;
(b) said first and second bleaching steps are effected at a temperature of about 50° to about 65° C.;
(c) said second bleaching step is commenced about 30 seconds to about 5 minutes after commencement of the first bleaching step;
(d) said first bleaching step is effected at a pulp suspension pH of about 1 to about 6;
(e) said second bleaching step is effected at a pulp suspension pH of about 0.7 to about 3; and
(f) said chlorine dioxide in said aqueous solution of chlorine dioxide and chlorine constitutes about 30 to about 75% of the total available chlorine used in said first and second bleaching steps.

8. The method of claim 7 wherein said dissolved organic material content of said suspension is up to about 1.0% by weight TOC on pulp.

* * * * *